(12) United States Patent
Marquette

(10) Patent No.: US 8,398,157 B2
(45) Date of Patent: Mar. 19, 2013

(54) PILLAR REDUCTION BY OUTER PANEL CUT

(75) Inventor: Brooks Goodrich Marquette, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 12/868,848

(22) Filed: Aug. 26, 2010

(65) Prior Publication Data

US 2012/0049575 A1 Mar. 1, 2012

(51) Int. Cl.
*B62D 25/04* (2006.01)

(52) U.S. Cl. ............................................... 296/193.06

(58) Field of Classification Search ............ 296/193.06, 296/84.1, 190.01, 201, 202
See application file for complete search history.

(56) References Cited

U.S. PATENT DOCUMENTS

| | | | |
|---|---|---|---|
| 5,586,799 A * | 12/1996 | Kanemitsu et al. | 296/203.02 |
| 5,810,428 A * | 9/1998 | Maki | 296/203.02 |
| 5,941,597 A * | 8/1999 | Horiuchi et al. | 296/203.01 |
| 5,988,733 A * | 11/1999 | Kamo et al. | 296/187.05 |
| 6,305,736 B1 * | 10/2001 | Enomoto et al. | 296/146.1 |
| 6,340,200 B1 * | 1/2002 | Enomoto et al. | 296/187.09 |
| 6,340,203 B2 * | 1/2002 | Enomoto et al. | 296/203.02 |
| 6,824,204 B2 * | 11/2004 | Gabbianelli et al. | 296/205 |
| 6,854,790 B2 * | 2/2005 | Yoshida | 296/187.05 |
| 7,168,756 B2 | 1/2007 | Hasegawa et al. | |
| 7,344,186 B1 | 3/2008 | Hausler et al. | |
| 7,954,885 B2 | 6/2011 | Sase | |
| 8,157,317 B2 * | 4/2012 | Orii | 296/190.01 |
| 2006/0138807 A1 * | 6/2006 | Hasegawa et al. | 296/193.06 |
| 2010/0060037 A1 | 3/2010 | Terai et al. | |
| 2010/0270828 A1 * | 10/2010 | Baccouche et al. | 296/187.12 |
| 2011/0101735 A1 * | 5/2011 | Fujita | 296/193.06 |

FOREIGN PATENT DOCUMENTS

| | | | |
|---|---|---|---|
| EP | 1 145 937 | | 6/2005 |
| EP | 1 914 152 | | 4/2008 |
| JP | 09-039833 A | | 10/1997 |
| JP | 2001146174 A | * | 5/2001 |
| JP | 2001163255 A | * | 6/2001 |
| JP | 2006069431 A | * | 3/2006 |
| JP | 2006248461 A | * | 9/2006 |
| JP | 2007055420 A | * | 3/2007 |
| JP | 2007302073 A | * | 11/2007 |
| JP | 2007308014 A | * | 11/2007 |
| JP | 2011255800 A | * | 12/2011 |

* cited by examiner

*Primary Examiner* — Glenn Dayoan
*Assistant Examiner* — Paul Chenevert
(74) *Attorney, Agent, or Firm* — Fay Sharpe LLP

(57) ABSTRACT

A vehicle body construction, namely a front or A-pillar, extends between a windshield and a door opening. The construction includes an inner body panel with first and second flanges along opposite edges of a central portion, an outer body panel with first and second flanges along opposite edges of a central portion, and a stiffener received between the inner and outer body panels. The stiffener has first and second flanges disposed along opposite edges of a central portion. Each of the inner body panel, outer body panel, and stiffener second-edges are joined together while the first edges of the inner body panel and stiffener are joined together adjacent the windshield and the first edge of the outer body panel is joined to the central portion of the stiffener. This structural arrangement improves visibility from the interior, provides greater visible body color from the exterior, improves both the aerodynamic and styling flexibility, and improves the sectional inertia or overall stiffness of the A-pillar with lighter weight materials.

18 Claims, 4 Drawing Sheets

PILLAR REDUCTION BY OUTER PANEL CUT

BACKGROUND OF THE DISCLOSURE

This application relates to a vehicle body construction, and more particularly to the structure of a front pillar or A-pillar located between a windshield and door opening. More particularly, the disclosure is directed to maintaining strength while keeping visibility obstruction to a minimum, although other aspects may find application in related environments encountering such issues.

Typically, a front or A-pillar of an automotive vehicle includes an outer body panel that has a door flange and a windshield flange along adjacent edges. The outer body panel cooperates with an inner body panel, and also a stiffener that is interposed between the inner and outer body panels. All three components include a door flange and a windshield flange, in which respective flanges are secured together, e.g., are welded together. Sometimes, a garnish covers a portion of the A-pillar outer panel and the garnish is either painted to provide a visible exterior surface of the front pillar to match the remainder of the vehicle body, on in some cases the color varies from the remainder of body color for styling purposes.

In the automotive vehicle industry, it is desirable to minimize the obstruction angle associated with the A-pillar while still having sufficient strength and rigidity to meet government rollover regulations and minimize the overall weight of the structure. It is also desirable to provide an A-pillar that is visible from the exterior while reducing the obstruction view from the interior.

Thus, a need exists for an improved vehicle body structure that provides the desired sectional inertia and increased overall stiffness of the A-pillar, has a reduced impact on styling and design, keeps weight to a minimum, and advantageously limits obstruction to the view of the driver from the interior of the vehicle.

SUMMARY OF THE DISCLOSURE

A vehicle body construction extends between a windshield and a door opening. The vehicle body construction includes an inner panel having first and second flanges disposed along opposite edges of a central portion. An outer panel also has first and second flanges disposed along opposite edges of a central portion. Further, a stiffener is received between the inner and outer panels and includes first and second flanges along opposite edges of a central portion. The second edges of each of the inner panel, outer panel, and the stiffener are joined together. The first edges of the inner panel and stiffener are joined together adjacent the windshield, and the first edge of the outer panel is joined to the central portion of the stiffener.

The central portions of the inner panel, outer panel, and stiffener are disposed in spaced relation from one another.

A garnish extends in covering relation over the outer panel and stiffener from the windshield to the second edge of the outer panel. The garnish preferably includes a drip mold along one edge that engages an edge of the windshield.

In an exemplary embodiment, the outer panel has a wider, second width along a header portion of the door opening and a minimal, first width along the front pillar portion of the door opening.

In the exemplary embodiment, the outer panel preferably has a thickness less than the thicknesses of both of the stiffener and the inner panel.

The new A-pillar construction meets roof crush requirements.

The construction does not sacrifice stability, and typically improves visibility while providing aerodynamic flexibility.

The enlarged garnish also enhances styling flexibility.

Cost and weight can also be optimized.

Still other features and benefits of the present disclosure will become apparent upon reading and understanding the following detailed description.

DETAILED DESCRIPTION OF THE PREFERRED EMBODIMENT

Figure 1:
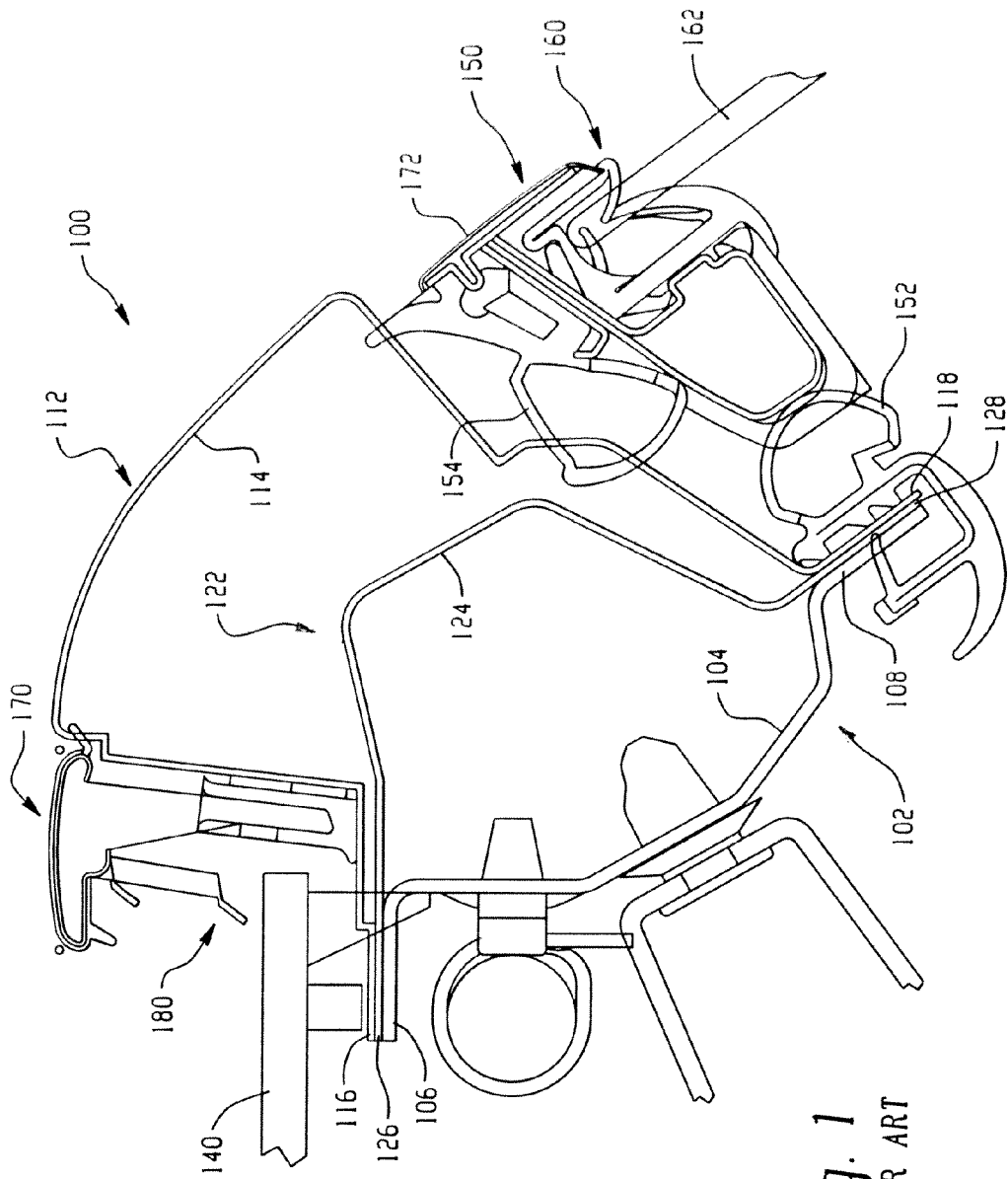
FIG. 1 is a cross-sectional view through a front or A-pillar of a prior art structure.

Turning first to FIG. 1, a prior art vehicle body A-pillar construction 100 includes an inner panel or inner body panel 102 having a central portion 104, a first or windshield flange 106 and a second or door flange 108 that extend along adjacent edges of the central portion 104. Further, an outer panel or outer body panel 112 includes a central portion 114, a first or windshield flange 116, and a second or door flange 118. Again, the flanges are disposed along outer edges of the central portion of outer body panel. In similar fashion, stiffener 122 has a central portion 124, a first or windshield flange 126, and a second or door flange 128. Each of the central portions 104, 114, 124, respectively, is spaced from an adjacent central portion, while the windshield flanges 106, 116, 126 are disposed in generally stacked relation with one another and secured together typically by being welded together. Likewise, the door flanges 108, 118, 128 are likewise disposed in stacked relation and secured or welded together.

The A-pillar 100 extends from a header portion of the door along an edge of windshield 140 to a windshield cowl (not shown) and extends transversely between the edge of the windshield 140 and the door 150. Door seals 152, 154 seal between the door and the outer body panel 112 while a glass run 160 receives a perimeter edge of movable window 162 in the door.

In the embodiment of FIG. 1, a pair of garnish member 170, 172 are disposed between the windshield 140 and the front pillar, and the A-pillar and the door 150, respectively. Extending from the first garnish 170 is a seal or what is commonly referred to as a drip mold 180 that engages the edge of windshield.

Figure 2:
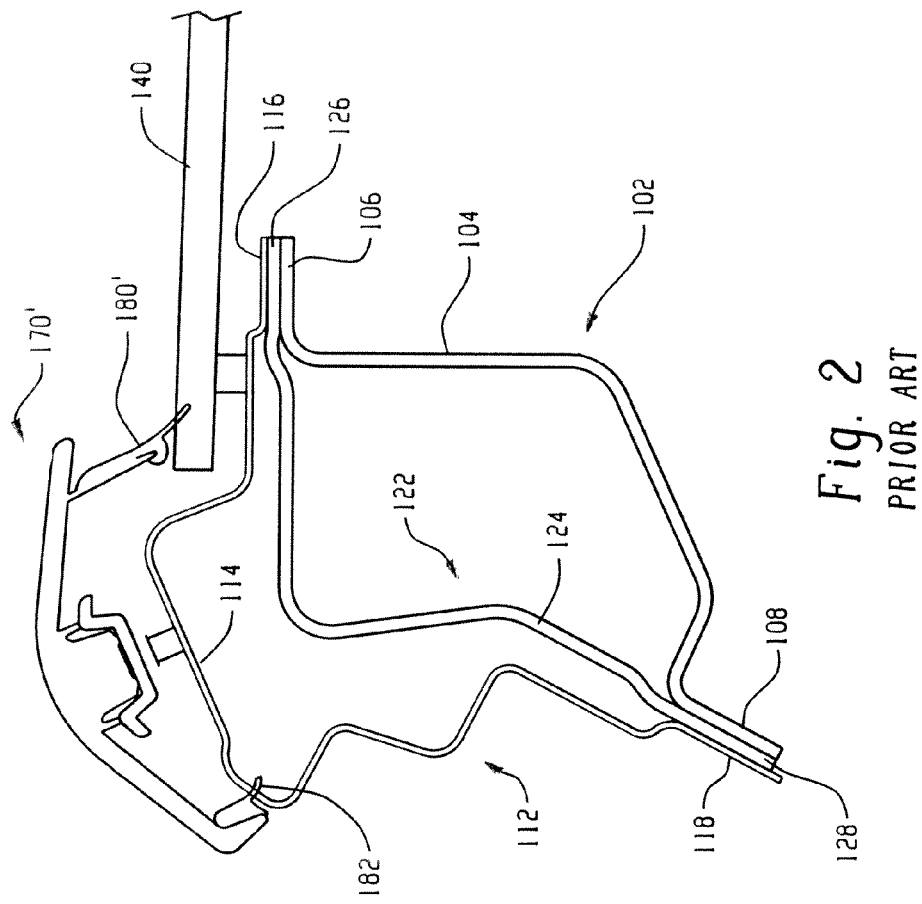
FIG. 2 is a cross-sectional view through another prior art arrangement incorporating a garnish.

FIG. 2 is another prior art structure that has many similar components. For ease of reference and brevity, like reference numerals refer to like components. A primary distinction between the embodiments of FIGS. 1 and 2 is that a single garnish member 170' is secured to the outer body panel 112 and includes a first seal or drip mold 180' that engages a side perimeter edge of the windshield 140 and also includes a second seal 182 that engages a surface of the A-pillar, particularly an external surface of the outer body panel 112.

There is an increasing desire to improve visibility or line of sight for the driver as the driver looks from the interior in the direction of the A-pillar. Just as importantly, this improved visibility must be achieved without any loss in the strength or sectional inertia provided by the vehicle body construction or A-pillar. There are also competing concerns relating to improved aerodynamic flexibility and styling flexibility as noted in the Background. To achieve these benefits, a modified vehicle body construction or A-pillar 200, as shown in FIGS. 3-5, has been developed.

Figure 3:
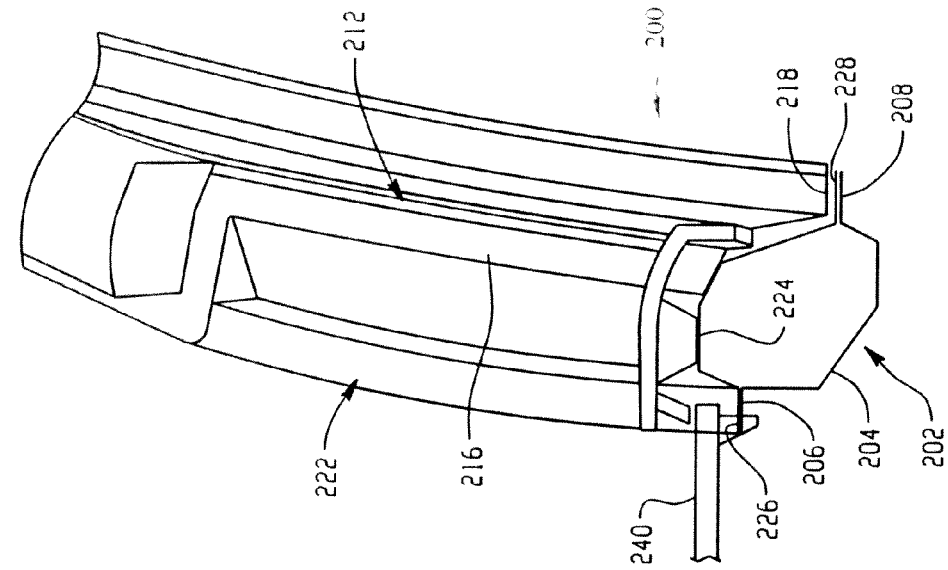
FIG. 3 is a perspective view of a front pillar extending between a windshield and door.
Figure 4:
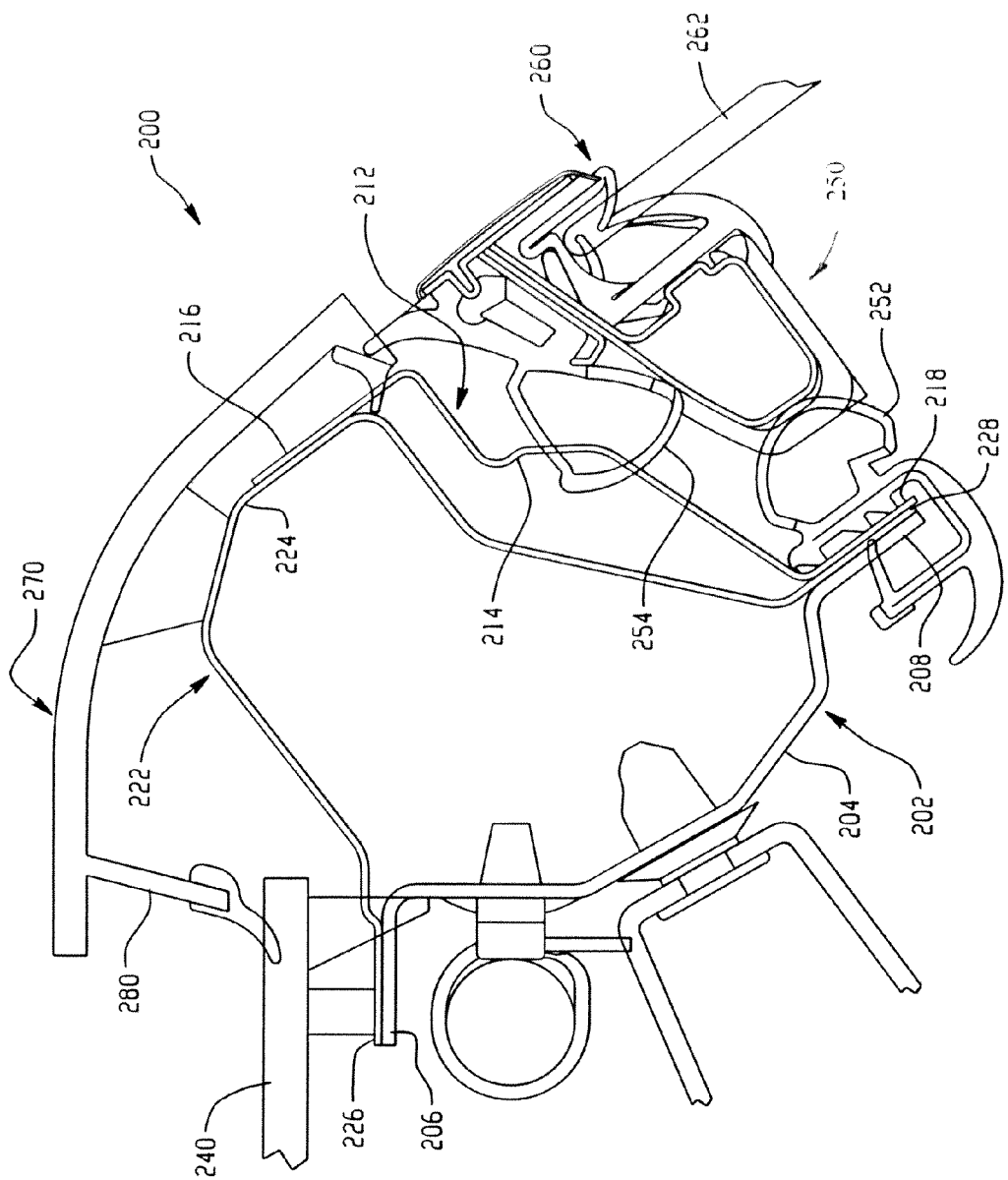
FIG. 4 is a cross-sectional view through the front pillar of FIG. 3.
Figure 5:
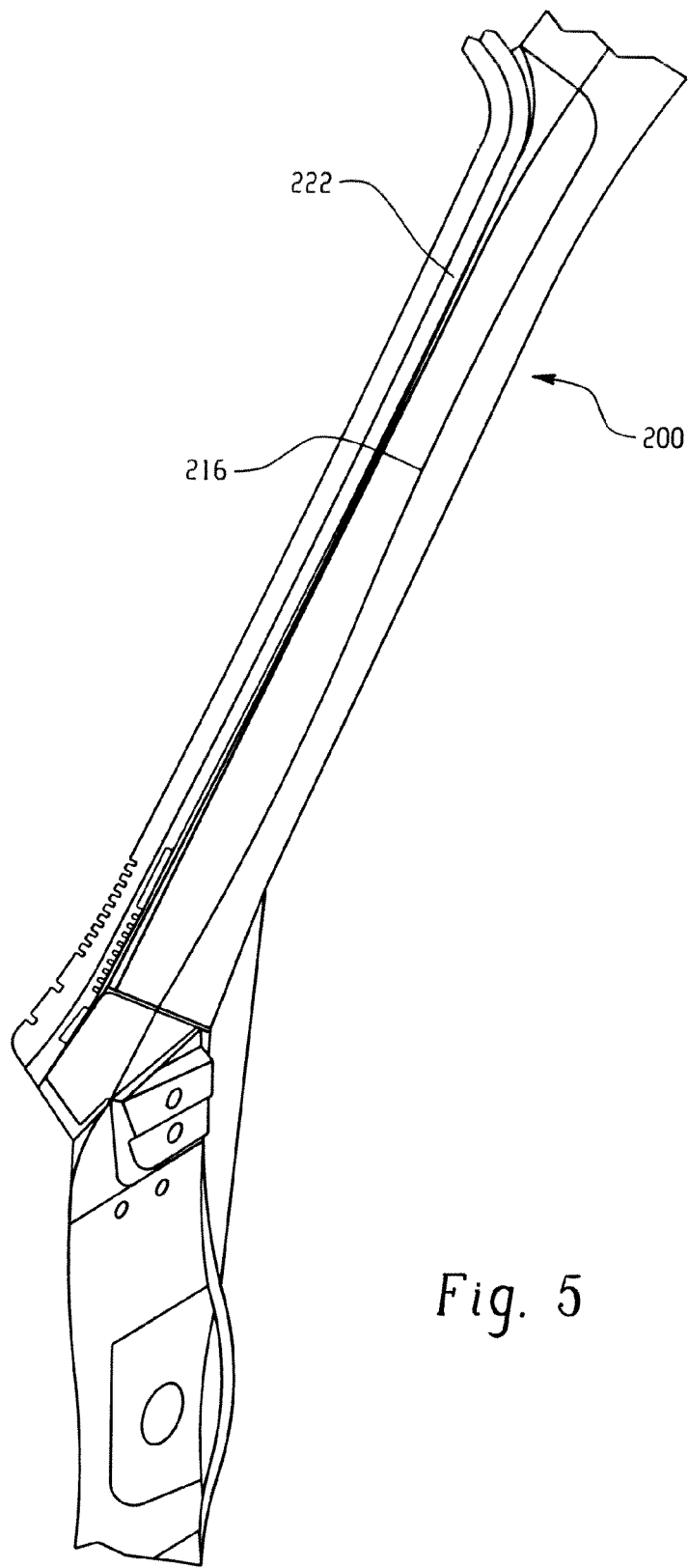
FIG. 5 is a perspective view of the front pillar.

As is evident in FIGS. 3 and 4, the A-pillar includes an inner panel or inner body panel 202 that has a central portion 204 and a first or windshield flange 206 along one edge, and a second or door flange 208 along a second edge. In addition, the outer body panel 212 has a central portion 214 with a first or stiffener flange 216 on one edge and a second or door flange 218 along the other edge. Likewise, stiffener 222 has a central portion 224 interposed between a first or windshield flange 226 and a second or door flange 228. Comparing the new embodiment of FIGS. 3 and 4 with the prior art arrangements of FIGS. 1 and 2 illustrates that a height of the stiffener has been significantly increased in the embodiment of FIGS. 3-4. As will be appreciated by one skilled in the art, increasing the height of the stiffener encountered issues in the prior art arrangements in an effort to position the outer body panel over the central portion 224 of the stiffener. In the present arrangement of FIGS. 3 and 4, however, the height of the stiffener 222 can be increased which correspondingly increases the sectional inertia and likewise increases the overall stiffness of the A-pillar 200. However, by substantially reducing the width of the outer body panel 212, i.e. by forming a cutout in the outer panel (as best illustrated in FIGS. 3 and 5), the stiffener flange 216 is secured only to the central portion 224 of the stiffener. Thus, beneath the edge of the windshield, the inner body panel windshield flange 206 and the stiffener windshield flange 226 are secured or welded together. On the other hand, the door flanges 208, 218, 228 are welded together in the same fashion as in the prior art. The welded door flanges still serve to support the door seals 252, 254, as well as the glass run 260 that receives a perimeter edge of the movable window 262.

The outer body panel 212 is not primarily relied on for its stiffness, although the outer body panel does offer some strength, the outer body panel is primarily a thin member using mild grade steel while the inner body panel and the stiffener are both thicker using a high strength grade steel. By way of an exemplary embodiment, the outer body panel 212 has a thickness ranging on the order of 0.75 mm, while the thicknesses for the stiffener 222 and the inner body panel 202 are each on the order of 1.60 mm to 1.80 mm. These thickness dimensions are representative only, and one skilled in the art will appreciate that still other dimensions may be used in various automotive vehicles without departing from the scope and intent of the present disclosure. Through this modification of FIGS. 3-5, a greater section modulus is obtained with a thinner gauge material used for the inner body panel and the stiffener. Thus, a lighter structure that is stiffer can be obtained. Another way to evaluate this vehicle body construction 200 is that an increased height of the stiffener 222 is achieved with an increased section modulus without impacting mounting of the outer body panel 212 into the A-pillar structure 200.

Providing this "cutout" or reduced width of the outer body panel 212 as the outer body panel extends along the A-pillar from the roof to the windshield cowl allows the structure to meet roof crush standards. The new arrangement also advantageously improves the aerodynamic flexibility since garnish 270 now extends from the edge of the windshield 240 to the door 250 in covering relation with the stiffener 222 and outer body panel 212. The substantially enlarged garnish 270 includes an integrated drip mold 280 that seals along an outer surface of the windshield 240. Moreover, the garnish 270 can be secured to the stiffener 222, for example, along the central portion 224 of the stiffener in any conventional manner such as with clips, bolts, pins, tape, etc. The garnish has a generally curved contour as the garnish extends from the windshield toward the door and the garnish eliminates visible gaps between the garnish 270 and the windshield 240 while providing a substantially enlarged external or show surface that can be used for improved styling flexibility. That is, greater visible body color can be achieved, or a contrasting body color used.

Increasing the sectional inertia is also achieved with the added benefit of greater visibility. Depending on the rake angle of the windshield 240, and the distance of the A-pillar from the eye point of the driver, by measuring along a horizontal plane at the eye point and cutting a section through the A-pillar that is then measured from where the eye point first touches the body panel of the windshield edge and then at the door edge, the included angle is thereby reduced with increased height of the structure of the A-pillar and the reduced included angle provides for improved visibility.

The larger garnish 270 with the integrated drip mold 280 provides for a lip seal that engages the outer surface of the windshield 240 for about the same cost. If the garnish 270 is a plastic material, the garnish is likely to be attached to the central portion 224 of the stiffener. Alternatively, a metal garnish may be used and secured in any convenient, well-known manner. The integrated drip mold and the garnish provide for greater body color along the A-pillar and provide a long, arcuate, continuous surface without the gap associated with the prior art arrangement. The outer body panel 212 is preferably tack-welded to the stiffener 222 and then structural welds are made for assembling all three panels (inner body panel, outer body panel and stiffener) along the door edge, while structurally welding only two sheets (inner body panel and stiffener) together along the windshield edge in the new design. A further benefit is a potential reduction in weight since the material used for the garnish is possibly lighter than the material forming the outer body panel. Also, the stiffener can be thinner due to the increased height and increased section modulus.

This A-pillar structure keeps the obstruction angle to a minimum from the perspective of the driver while still meeting government rollover regulations and keeping weight to a minimum. It also allows for a larger visible A-pillar from the exterior with a reduced obstruction view from the interior. By moving the stiffener outboard along the A-pillar, the resultant moment about the center pillar is reduced which would aid in meeting roof crush requirements even in those A-pillar structures that do not use a garnish.

The disclosure has been described with reference to the preferred embodiments. Obviously, modifications and alterations will occur to others upon reading and understanding the preceding detailed description. It is intended that the disclosure be construed as including all such modifications and alterations.

I claim:
1. A vehicle body construction extending between a windshield and a door opening, the vehicle body construction comprising:
   an inner panel having first and second flanges disposed along opposite edges of a central portion;
   an outer panel having first and second flanges disposed along opposite edges of a central portion, the outer panel has a minimal first width along a front pillar portion of the door opening and a wider, second width along a header portion of the door opening;

a stiffener received between the inner and outer panels having first and second flanges disposed along opposite edges of a central portion; and along a first portion between the windshield and door opening, the first edges of each of the inner panel, stiffener, and outer panel being joined together and the second edges of each of the inner panel, stiffener, and outer panel being joined together, and along a second portion between the windshield and door opening, the first edges of the inner panel and stiffener being joined together adjacent the windshield, the first edge of the outer panel joined to the central portion of the stiffener, and the second edges of each of the inner panel, outer panel, and the stiffener being joined together.

2. The vehicle body construction of claim 1 wherein the outer panel has a thickness less than thicknesses of both of the stiffener and the inner panel.

3. The vehicle body construction of claim 1 wherein the central portions of the inner panel, outer panel, and the stiffener are disposed in spaced relation from one another.

4. The vehicle body construction of claim 3 further comprising a garnish that extends in covering relation over the body construction from the windshield to the second edge of the outer panel.

5. The vehicle body construction of claim 1 further comprising a garnish that extends in covering relation from the windshield to the second edge of the outer panel.

6. The vehicle body construction of claim 5 wherein the garnish extends from the windshield to the door.

7. The vehicle body construction of claim 1 wherein the outer panel has a reduced width between an edge of the windshield and the door opening as the outer panel extends from a roof toward a windshield cowl.

8. The vehicle body construction of claim 7 further comprising a garnish that covers the inner panel, stiffener, and the outer panel from the roof to the windshield cowl.

9. The vehicle body construction of claim 8 wherein the garnish includes a drip mold that engages a side of the edge of the windshield.

10. A body construction along an A-pillar of an automotive vehicle comprising:

an inner body panel extending along the A-pillar having a central portion bordered by a windshield flange and a door flange;

a stiffener extending along the A-pillar having a central portion bordered by a windshield flange and a door flange;

an outer body panel extending along the A-pillar having a central portion bordered by a door flange and a stiffener connecting flange, wherein the door flanges of each of the inner body panel, stiffener, and outer body panel are each welded together, and central portions of the inner panel, outer panel, and the stiffener are disposed in spaced relation from one another, the stiffener connecting flange of the outer body panel is welded to the stiffener central portion at a location less than one-half of a dimension between the door flange and windows flange at a region thereof that is less than a maximum spaced dimension between the inner body panel and stiffener, and the windshield flanges of the stiffener and the inner body panel are welded together; and a garnish extending along the A-pillar and overlying the outer body panel and the stiffener from the windshield to the door opening.

11. The vehicle body construction of claim 10 wherein the garnish is formed from a lighter weight material than the outer body panel.

12. The vehicle body construction of claim 10 further comprising a drip edge extending from the garnish for sealing engagement with the windshield along the A-pillar.

13. The vehicle body construction of claim 10 wherein the garnish is non-metallic.

14. The vehicle body construction of claim 13 wherein the garnish is formed from a lighter weight material than the outer body panel.

15. The vehicle body construction of claim 10 wherein the outer body panel has a lesser thickness than the inner body panel.

16. The vehicle body construction of claim 15 wherein the outer body panel has a lesser thickness than the stiffener.

17. The vehicle body construction of claim 16 further comprising a drip edge extending from the garnish along the windshield and sealingly engaging an outer surface thereof.

18. The vehicle body construction of claim 17 wherein the garnish has a generally curved cross-section over its width from the door opening to the windshield.

* * * * *